(12) United States Patent
Bajaj et al.

(10) Patent No.: US 10,296,635 B2
(45) Date of Patent: May 21, 2019

(54) AUDITING AND AUGMENTING USER-GENERATED TAGS FOR DIGITAL CONTENT

(71) Applicant: Adobe Inc., San Jose, CA (US)

(72) Inventors: Payal Bajaj, Pradesh (IN); Shriram V S Revankar, Bangalore (IN); Priyanshu Srivastava, Gorakhpur (IN); Ponnurangam Kumaraguru, New Delhi (IN); Mridul Kavidayal, Nainital (IN); Md. Nadeem Akhtar, Bihar (IN)

(73) Assignee: Adobe Inc., San Jose, CA (US)

( * ) Notice: Subject to any disclaimer, the term of this patent is extended or adjusted under 35 U.S.C. 154(b) by 321 days.

(21) Appl. No.: 15/003,668

(22) Filed: Jan. 21, 2016

(65) Prior Publication Data

US 2017/0212949 A1   Jul. 27, 2017

(51) Int. Cl.
*G06F 17/30* (2006.01)

(52) U.S. Cl.
CPC .. *G06F 17/30598* (2013.01); *G06F 17/30327* (2013.01); *G06F 17/30867* (2013.01)

(58) Field of Classification Search
CPC ................................................ G06F 17/30734
See application file for complete search history.

(56) References Cited

U.S. PATENT DOCUMENTS

| | | | | |
|---|---|---|---|---|
| 2009/0287674 A1* | 11/2009 | Bouillet | ............ | G06F 17/30884 |
| 2010/0030552 A1* | 2/2010 | Chen | ................ | G06F 17/30734 704/9 |

OTHER PUBLICATIONS

Li,"Learning Tag Relevance by Neighbor Voting for Social Image Retrieval", MIR '08 Proceedings of the 1st ACM international conference on Multimedia information retrieval, Oct. 31, 2008, 8 pages.
Lin,"Web Image Retrieval Re-Ranking with Relevance Model", WI 2003. Proceedings IEEE/WIC International Conference on Web Intelligence,, Oct. 2009, 8 pages.
Liu,"Tag Ranking", Track: Rich Media / Session: Tagging and Clustering, 2009, pp. 351-360.
Wang,"Image Annotation Refinement using Random Walk with Restarts", 06 Proceedings of the 14th annual ACM international conference on Multimedia, 2006, 4 pages.

* cited by examiner

*Primary Examiner* — Hung Q Pham
(74) *Attorney, Agent, or Firm* — SBMC

(57) ABSTRACT

Techniques and systems for auditing and augmenting user-generated tags for digital content are described. A corpus is generated for each tag associated with digital content to represent different aspects of the tag's definition. A hierarchy of semantic relationships between the tags is created based a corpus co-occurrence between the tags to relate at least two tags having different levels of specificity. Some of the tags are verified with the digital content based on feature detection, and a correspondence to the digital content is determined for each verified tag. The correspondence of the verified tags is then propagated up the hierarchy to others of the tags that are semantically related to the verified tags but which were not verified by the feature detection. The verified tags and the verified other tags are then assigned to the digital content to control how the digital content is retrieved when subject to a search.

20 Claims, 8 Drawing Sheets

200

700

```
┌─────────────┐
│   FIG. 6    │
└──────┬──────┘
       ▼
┌─────────────────────────────────┐
│ Identify additional tags for    │
│ domain expansion of the         │
│ digital content                 │
│ 702                             │
└──────────────┬──────────────────┘
               ▼
┌─────────────────────────────────┐
│ Add the additional tags to the  │
│ hierarchy                       │
│ 704                             │
└──────────────┬──────────────────┘
               ▼
┌─────────────────────────────────┐
│ Verify the additional tags      │
│ using relevance propagation     │
│ 706                             │
└──────────────┬──────────────────┘
               ▼
┌─────────────────────────────────┐
│ Assign verified additional tags │
│ to the digital content          │
│ 708                             │
└──────────────┬──────────────────┘
               ▼
┌─────────────────────────────────┐
│ Assign a relevance score to the │
│ digital content based on a      │
│ relevance of verified tags      │
│ 710                             │
└──────────────┬──────────────────┘
               ▼
┌─────────────────────────────────┐
│ Control how the digital content │
│ is retrieved based on the       │
│ relevance score                 │
│ 712                             │
└─────────────────────────────────┘
```

Fig. 7

AUDITING AND AUGMENTING USER-GENERATED TAGS FOR DIGITAL CONTENT

BACKGROUND

Online digital media platforms allow users to upload digital content (e.g., videos, images, and so on) and add tags for browsing and retrieval of their digital content. Tags can be specific, such as "basketball", or generic (e.g., abstract), such as "game". It is essential to validate the relevance of these tags with respect to the digital content so as to reduce misleading or erroneous tags and improve search results. Validating these tags is challenging because the domain of variations of user-generated tags is substantially infinite Additionally, conventional tag validation techniques cannot validate a wide variety of generic tags (e.g., "sport", "movie", "music album", and so on) associated with the digital content because those generic tags cannot simply be handled by conventional image feature processing techniques used to identify objects in the digital content. Because of these limitations in the conventional techniques, a vast amount of online digital content includes non-validated tags, which can be misleading and can lead to inaccurate search results.

SUMMARY

Techniques and systems for auditing and augmenting user-generated tags for digital content are described. In one or more implementations, tag corpuses associated with the user-generated tags for digital content are created to model the tags. Each tag corpus models a tag based on a collection of other tags representing different aspects of the tag's definition. The tag corpuses can then be used to create semantic relationships between the tags based on corpus co-occurrence between the tags. The corpus co-occurrence relates two or more tags having different levels of specificity by determining a number of occurrences of a tag in another tag's corpus, and vice versa. Then, a hierarchy is created to model the semantic relationships between the tags.

A verification process is applied to verify which of the user-generated tags correspond to the digital content. One example verification process includes applying object detection or face detection to the digital content to obtain results for comparison to the tags to determine a correspondence of each tag to the digital content. This process may verify some of the tags, but may not be capable of verifying all of the tags because some of the tags may be too abstract to verify with the digital content. To verify these more abstract tags, the correspondence of the verified tags can be propagated up the hierarchy to the more abstract tags that are semantically related to the verified tags. Following this, the verified tags as well as the verified other tags are all assigned to the digital content to control how the digital content is retrieved when subject to a search. In this way, a wide variety of tags having different levels of specificity, such as abstract or generic tags, can be verified based on the hierarchical semantic relationships between the tags, which improves accuracy and relevance of search results.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 7 is a flow diagram depicting a procedure in an example implementation in which techniques for augmenting user-generated tags for digital content are employed in accordance with one or more embodiments.

DETAILED DESCRIPTION

Overview

Figure 1:
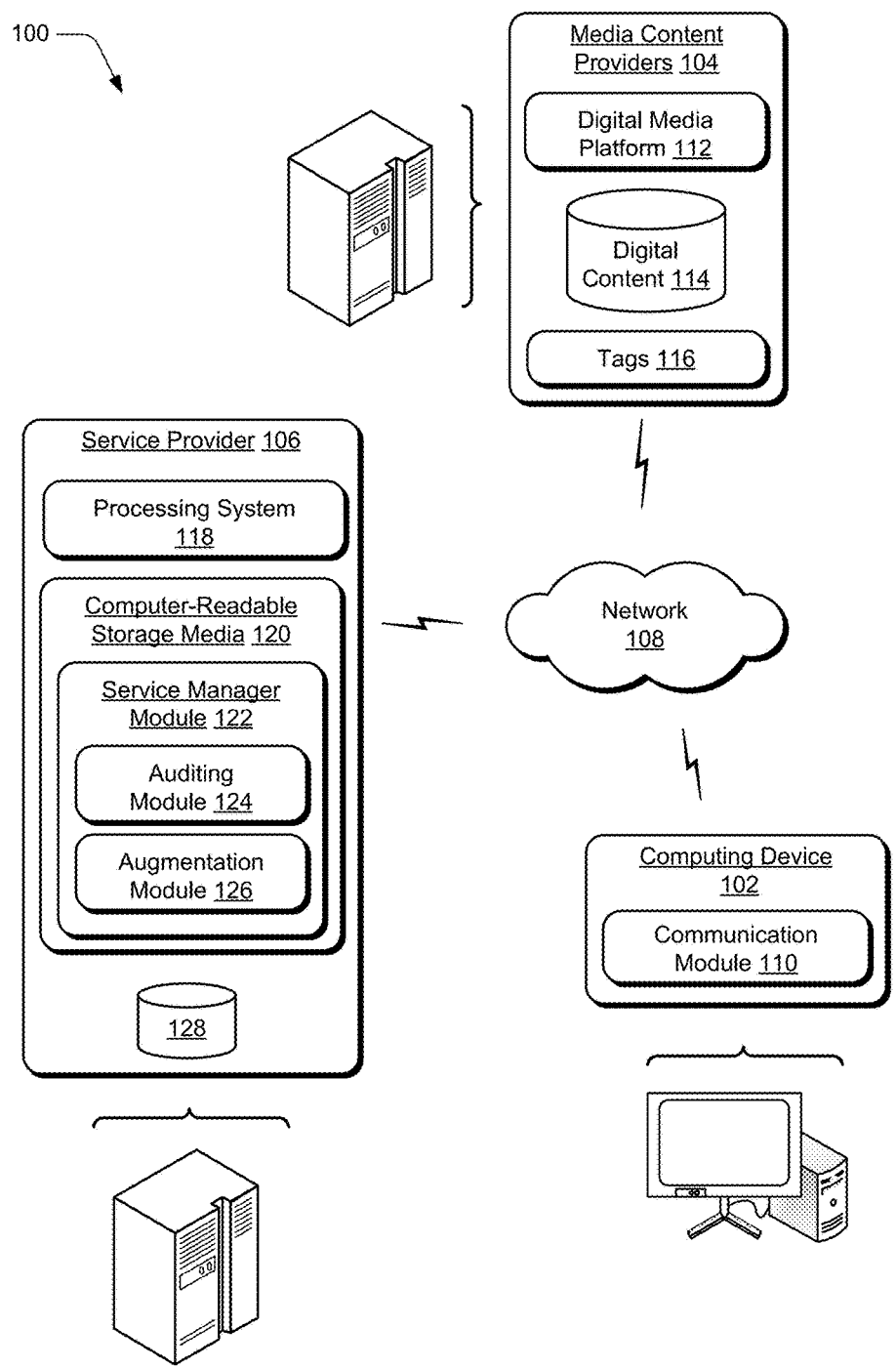
FIG. 1 is an illustration of an environment in an example implementation that is operable to employ techniques and systems for auditing and augmenting user-generated tags for digital content in accordance with one or more embodiments.

Conventional techniques used for auditing user-generated metadata for digital content can be limited and inefficient. For instance, conventional techniques for verifying user-generated tags with the digital content are limited to verifying tags that have a particular level of specificity, and do not support verification of a large number of abstract or generic tags that have a relatively lower level of specificity. Also, such tags (e.g., "movie" or "album") could also be associated with a wide variety of images, making image feature processing insufficient for the auditing purpose. Further complications arise due to inherent complexities of textual content of the tags, which include problems associated with redundancy, ambiguity, polysemy, and synonymy. Solving these problems is not trivial at least because the domain of variations in the tags generated by users is substantially infinite. These inefficiencies and complications can result in erroneous search results due to misleading tags associated with digital content.

In contrast, techniques and systems described herein provide a mechanism to verify the correspondence of user-generated tags, including abstract and generic tags to digital content with which they are associated. These techniques establish semantic relationships between the user-generated tags to relate tags having different levels of specificity, such as a specific tag (e.g., "basketball") and a generic tag (e.g., "game"), and create a hierarchy of related tags. Some of the tags (e.g., specific tags) can be verified with the digital content using feature detection techniques to determine a relevance of those tags to the actual content of the digital content, while other tags (e.g., generic or abstract tags) cannot be verified in the same way using the feature detection techniques. Using the hierarchy of semantic relationships, however, the relevance of those specific tags can be propagated to the generic or abstract tags that are related via the hierarchy. In this way, tags that were not verifiable using conventional techniques, can now be verified with the digital content using the techniques described herein.

The techniques and systems described herein further provide a mechanism to augment the user-generated tags to expand a search domain associated with the digital content for improved browsing and retrieval of the digital content. For example, additional tags that relate to the verified tags can be identified. To reduce processing burden, only the verified tags are used to find additional tags. Then, the additional tags can be added to the hierarchy of semantic relationships, and verified in the same manner as described above. In this way, the tags for the digital content can be expanded for tags of varying levels of specificity to facilitate improved textual content for browsing and retrieval of digital content.

As used herein, the term "digital content" is representative of data, such as electronic text content (e.g., messages), digital photographs, video, audio, web pages, and so on. Additionally, the digital content can include one or more objects, such as a ball, a bicycle, a person, a dog, a building, a banana, and so on. The digital content can be displayed for the user, and can be selectable by the user to perform one or more actions.

As used herein, the term "tag" refers to a language element descriptor, such as one or more keywords, that can be associated with digital content to describe some aspect of the digital content to enable search engines to index the digital content for retrieval when subject to a search. An example tag is a metatag, which can be used in Hypertext Markup Language (HTML) to describe some aspect of the contents of digital content, such as a web page, a video, an image, and so on. Many tags can be generated by a user when the user creates the digital content or uploads the digital content to a media platform.

In the following discussion, an example environment is first described that may employ the techniques and systems described herein. Example procedures are then described which may be performed in the example environment as well as other environments. Consequently, performance of the example procedures is not limited to the example environment and the example environment is not limited to performance of the example procedures. Further examples of the above-described terms may be found in relation to the following discussion. Finally, an example system and device are described that are operable to use the techniques and systems described herein in accordance with one or more embodiments.

Example Environment

FIG. 1 is an illustration of an environment 100 in an example implementation that is operable to utilize techniques and systems described herein. The illustrated environment 100 includes a computing device 102, media content providers 104, and a service provider 106 that are communicatively coupled via a network 108. In addition, the computing device 102 as well as computing devices that implement the media content providers 104 and the service provider 106 may be configured in a variety of ways.

The computing devices, for example, may be configured as a desktop computer, a laptop computer, a mobile device (e.g., assuming a handheld configuration such as a tablet or mobile phone), and so forth. Additionally, a computing device may be representative of a plurality of different devices, such as multiple servers of the service provider 106 utilized by a business to perform operations "over the cloud" as further described in relation to FIG. 8.

Although the network 108 is illustrated as the Internet, the network may assume a wide variety of configurations. For example, the network 108 may include a wide area network (WAN), a local area network (LAN), a wireless network, a public telephone network, an intranet, and so on. Further, although a single network 108 is shown, the network 108 may be representative of multiple networks.

The computing device 102 is also illustrated as including a communication module 110. The communication module 110 is representative of functionality to communicate via the network 108, such as with one or more services of the media content providers 104 or the service provider 106. As such, the communication module 110 may be configured in a variety of ways. For example, the communication module 110 may be configured as a browser that is configured to "surf the web." The communication module 110 may also be representative of network access functionality that may be incorporated as part of an application, e.g., to provide network-based functionality as part of the application, an operating system, and so on. Thus, functionality represented by the communication module 110 may be incorporated by the computing device 102 in a variety of different ways.

The media content providers 104 are representative of various enterprises and/or services that provide digital media platforms 112 via which different users may interact and communicate. At least some of the digital media platforms 112, can include, for instance, webpages and/or web applications that enable users to view and post content.

The media content provider 104 is illustrated as also including digital content 114. The digital content 114 can include a variety of different content posted or uploaded by users. Some examples of digital content include videos, images, photographs, documents, and so on. To make the digital content 114 discoverable among the myriad of content currently available, users can generate and assign tags having different levels of specificity, such as tags 116, to the digital content 114. Because users can create the tags 116, human error and deception can affect the relevance of a particular tag to the digital content. For instance, a user may deceptively create a specific tag labeled "cat" for a video about skydiving, just to increase the popularity and number of views of the video based on the popularity of cat videos, even though the tag does not correspond to the content of the video. Because of this, it is essential to verify the tags 116 with the digital content 114. Some tags, such as tags having a relatively low level of specificity (e.g., "generic" or "abstract") cannot be verified using conventional techniques. The techniques and systems described herein, however, can verify the correspondence of generic or abstract tags with the digital content.

The service provider 106 represents a computing device having a processing system 118 that includes one or more processing devices (e.g., processors) and one or more computer-readable storage media 120. The computer-readable storage media 120 includes a service manager module 122 operable via the processing system 118 to implement corresponding functionality described herein. Although not illustrated, the computing device 102 and the media content providers 104 also include corresponding processing systems and computer-readable storage media to implement corresponding functionality described herein.

The service provider 106 is representative of functionality to provide one or more network-based services. The services are managed by the service manager module 122 to support a variety of different functionality. The services (e.g., web services), for instance, may be configured to support various functionalities associated with different network-based services, such as metadata verification, tag auditing, tag augmentation, and so on. Thus, a variety of different types of functionalities may be performed via the services supported by the service provider 106.

The service manager module 122 is configured to manage processing of data and/or content requested or provided by the computing device 102. In some instances, a user may wish to communicate with the service provider 106 to conduct a search for a video. The service manager module 122 can process the user's request and, if needed, communicate the request to an appropriate entity to properly service the request. In addition, the service manager module 122 can communicate with the media content providers 104 to search metadata associated with the digital content, such as the tags 116, that can be used to discover content, including the video, to recommend to the user based on the search.

The service manager module 122 is illustrated as including an auditing module 124 and an augmentation module 126. These modules can be components of, or remote from, the service manager module 122, or any combination thereof. In implementations, the service manager module 122 can utilize the auditing module 124 and the augmentation module 126 to perform a variety of functionalities that are described below in more detail.

The auditing module 124 is representative of functionality to audit metadata, such as tags 116, associated with digital content 114 to verify that the metadata corresponds to actual content of the digital content 114. In implementations, the auditing module 124 can establish a hierarchy of semantic relationships between tags associated with the digital content. A discussion of the hierarchy is provided in more detail below. A variety of different techniques can be used to verify some of the more specific tags, such as by applying feature detection techniques to extract features from the digital content and comparing those features to the tags. However, the more abstract tags generally cannot be verified in the same manner Thus, the auditing module 124 can use the hierarchy of semantic relationships to verify the more abstract tags by relying on a correspondence of verified tags to determine a correspondence of some of the more abstract tags that are related to the verified tags. If some of the abstract tags are related to the verified tags, then it can safely be assumed that those abstract tags should also be verifiable with the digital content. Thus, the auditing module 124 is configured to verify a variety of tags having different levels of specificity, and is described in further detail below.

The augmentation module 126 is representative of functionality to expand a search domain of the digital content 114 by augmenting the metadata (e.g., tags 116) associated with the digital content 114. The augmentation module 126 can utilize the verified tags to search for and obtain supplementary tags that can be added to the hierarchy, verified with the digital content 114, and assigned to the digital content 114 to improve browsing and retrieval of the digital content 114. Further discussion of the augmentation module 126 is provided below in more detail.

The service provider 106 is also illustrated as including storage 128, which may be a component of the service provider 106, may be remote from the service provider 106, or may be a third-party database. The storage 128 may be a single database, or may be multiple databases, at least some of which include distributed data. Thus, a variety of different types of storage mechanisms can be utilized for the storage 128. Further discussion of this and other features is provided below.

Example Implementations

The following discussion describes example implementations of auditing and augmenting user-generated tags for digital content that can be employed to perform various aspects of techniques discussed herein. The example implementations may be employed in the environment 100 of FIG. 1, the system 800 of FIG. 8, and/or any other suitable environment.

Figure 2:
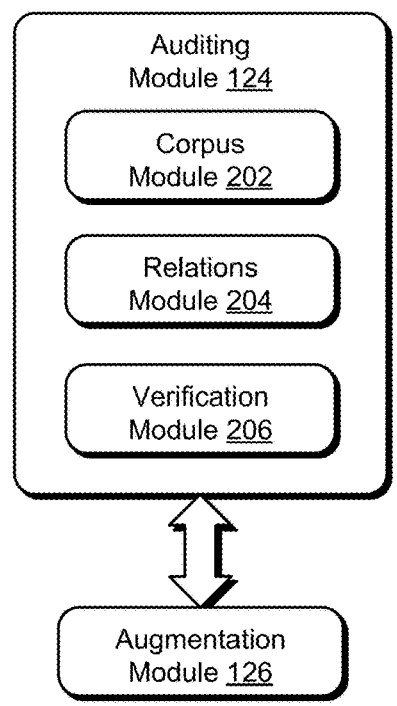
FIG. 2 depicts an example implementation that is operable to utilize techniques and systems for auditing and augmenting user-generated tags for digital content in accordance with one or more embodiments.

FIG. 2 depicts an example implementation that is operable to utilize techniques and systems for auditing and augmenting user-generated tags for digital content. The illustrated implementation 200 includes the auditing module 124 and the augmentation module 126 from FIG. 1 in more detail. The auditing module 124 is illustrated as including a corpus module 202, a relations module 204, and verification module 206. These modules can be components of the auditing module 124, may be remote from the auditing module 124, or may be distributed over multiple entities. Although these modules are illustrated separately, they may be combined into a single module or further divided into multiple different modules.

The corpus module 202 is representative of functionality to create a corpus for each of the tags 116 associated with the digital content 114. For instance, a search can be performed via the network 108 to obtain results that capture various meanings of a tag. Then, web page content of the top ten search results, for example, can be used to determine substantially all possible meanings of the tag. This information can then be used to create the corpus for the tag.

The relations module 204 is representative of functionality to establish hierarchical semantic relationships between the tags based on their corpus co-occurrence. Corpus co-occurrence is a model that determines a number of occurrences of an entity in another entity's corpus, and vice versa. For example, the tag "basketball" may occur three times in a corpus of the tag "game", while the tag "game" might occur twelve times in the corpus of the tag "basketball". This establishes a generic-specific relation between these tags with "game" as the generic tag and "basketball" as the specific tag.

Then, a hierarchy is established between these semantically related tags using conditional probabilities to relate tags having different levels of specificity, such as specific tags, generic tags, or abstract tags. In this way, the relationships between the tags are transformed into parent-child relationships based on the assumption that a more generic tag is likely to occur in a specific tag's corpus more times than a specific tag occurs in the generic tag's corpus. An example algorithm is reproduced below for hierarchical graph modeling of the semantic relationships between the tags:

---
Equation 1: Pseudo Code for Hierarchical Graph Modeling
---
```
G = (T, φ)           //graph with tags as vertices and no edges
for x ∈ T            //iterate over all tag pairs
    for y ∈ T and x ≠ y:
        if (p(x|y) - p(y|x) > θ):    //x occurs in corpus of y more
                than y occurs in corpus of x
            add edge y → x to G    //y becomes the parent of x (y is
                a generic tag, x is a specific tag)
        end if
    end for
end for
```
---

In Equation 1, the term G refers to a graph representing a hierarchy of semantic relationships between the tags, the term T refers to a set of tags (e.g., tags 116) associated with the digital content, and the term φ refers to edges (e.g., leaves) of the graph. In addition, the term p(x|y) refers to a probability of a first tag x occurring in a corpus of a second tag y, the term p(y|x) refers to a probability of the second tag y occurring in a corpus of the first tag x, and the term θ refers to a threshold value that can be pre-defined, user-defined, or both. The threshold θ can define a lower limit of difference in conditional probabilities to accept an edge to the hierarchical graph. If, for example, the probability of the tag x to occur in the corpus of tag y is greater than the probability of the tag probability of the tag y to occur in the corpus of tag x by a value greater than θ, then the tag y becomes a parent to the tag x in the graph G. Thus, the hierarchical graph modeling enables handling of a wide variety of generality and/or specificity in tags and metadata generated by users.

Frequently, the tags generated by users are one-word keywords. Although many tags can make sense, some of the tags are too generic or abstract to derive their semantics with respect to the content with which they are associated. For instance, tags such as "championship" and "league" are individually meaningful tags, but when used with other tags such as "basketball" and "player", the former tags may have a more justified meaning when referred to as "championship league" of a "basketball" game. Similarly, "dribbling" when related to "basketball" can help resolve ambiguities and polysemy in tags.

Because the hierarchical graph takes all the user-generated tags of the digital content into consideration together, the hierarchical graph captures a context of the digital content. By doing so, the relationships in the graph also capture the semantics of the tags in the context of the digital content. Thus, these relationships can be used to determine whether one or more pairs of tags can be combined to form an entity. One example of forming entities by combining tags is provided in Equation 2 below:

---
Equation 2: Pseudo Code for Entity Formation
---
```
while G is not stable:
    for x ∈ T             //iterate over all tag pairs
        for y ∈ T and x ≠ y:
            if (y → x and (p(x|y) > β):      //if x and y are
                    strongly related, combine x and y into a single node
            end if
        end for
    end for
end while
```
---

In Equation 2, the term β refers to a threshold value that governs if the tags are to be combined. For example, if the conditional probability of occurrence of tag x given tag y is greater than the threshold β, then tag x and tag y can be combined into a single entity. The threshold β can be user-defined or pre-defined.

The verification module 206 is representative of functionality to verify which of the tags 116 associated with the digital content 114 correspond to the digital content 114. First, some of the tags 116 can be verified by image and/or video processing techniques, such as feature detection. For instance, key frames of a video can be processed by feature detection techniques to identify objects, faces, annotations, classifiers, and so on, that are usable to verify whether the tags correspond to the content of the video. The tags that are verified in this manner generally include tags having a relatively higher level of specificity than other tags that are more generic or abstract.

Once tags are verified with the digital content, then the hierarchical graph can be used to audit other tags that were not verifiable via the feature detection, such as tags having a relatively lower level of specific, abstract tags, generic tags, and so on. For example, a degree of correspondence to the digital content can be determined for the verified tags, and the hierarchy of semantic relationships can be used to propagate the correspondence of the verified tags to related entities in the tags that were not verified, as illustrated in the following example equation:

---
Equation 3: Pseudo Code for Relevance Propagation
---
```
G_v = G
Mark Verified Tags in G_v
while G_v is not stable:        //until no more tags are verified
    for x ∈ T             //iterate over all tag pairs
        for y ∈ T and x ≠ y:
            if (y → x and x ∈ G_v and (p(x|y) - p(y|x) > α):
                add y to G_v      //tag y is verified by propagation
                    from tag x
            end if
        end for
    end for
end while
```
---

In Equation 3, the term $G_v$ refers to a graph of verified tags, and the term α refers to a threshold value usable to verify a tag. For instance, if the probability of tag x to occur in the corpus of tag y is greater than the probability of tag y to occur in the corpus of tag x by a value greater than the threshold α, and if tag x is verified, then by propagation, tag y is verified and added to the graph $G_v$ to create a set of verified tags.

The augmentation module 126 is representative of functionality to augment the set of verified tags associated with the digital content. In implementations, using only the verified tags, other tags relevant to the digital content can be added to expand the search domain of the digital content. This can be accomplished by identifying other tags that are related to verified tags in the set of verified tags in the same probabilistic manner that was used to create and validate tags in the hierarchical graph. For example, consider a set of verified tags including the tag "basketball" related to the tag "game". Similarly, the corpus of the tag "basketball" can be used to add an additional node to the hierarchical graph by relating "basketball" to "match". This allows augmentation of generic or abstract tags using the hierarchical graph, and verification of augmented tags by relevance propagation.

In implementations, a corpus of the set of verified tags can be used to extract topic models using any of a variety of topic model techniques, such as Latent Dirichlet Allocation (LDA). Topic modeling is a form of text mining, a way of identifying patterns in a corpus. For example, the corpus can be run through a tool that groups words across the corpus into "topics". These topic models can then be used to identify supplementary tags that are related to the verified entities. The supplementary tags can be added to the hierarchical graph using a corpus co-occurrence model similar to the corpus co-occurrence described above. A new hierarchical graph is then generated and relevance propagation can be performed over the new hierarchical graph to automatically verify which of the supplementary tags correspond with the digital content.

The correspondence of each tag can be represented by a data value, and the data value can be used to assign a score to the tag to indicate a level of correspondence to the digital content. The digital content can then be assigned an overall score based on the scores of individual tags associated with the digital content. Using the overall score of the digital content, search query results that include the digital content can be ranked. For example, a plurality of videos associated with tags matching a user query can be analyzed. The videos for which the tags correspond to the actual content of the videos can be ranked above other videos having tags that are misleading and that do not correspond to the content of the video. In this way, conventional content-based retrieval is improved because tags having a lower level of specificity (e.g., abstract or generic tags) can be verified in addition to the more specific tags.

Figure 3:
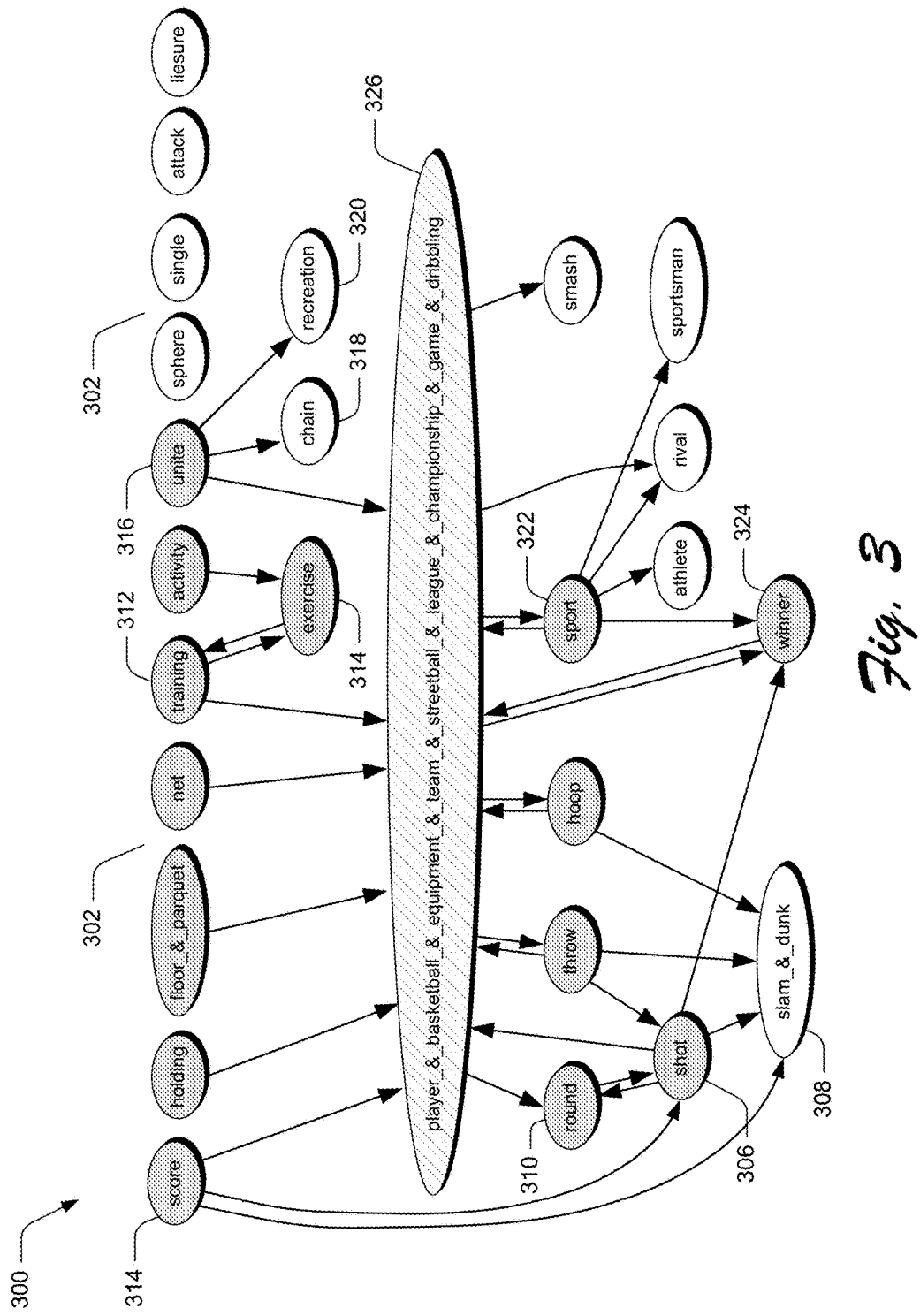
FIG. 3 depicts an example implementation that illustrates a hierarchical graph of semantic relationships between user-generated tags associated with digital content in accordance with one or more embodiments.

Having described an example implementation for auditing and augmenting user-generated tags for digital content, consider now FIG. 3, which depicts an example implementation 300 that illustrates a hierarchical graph of semantic relationships between user-generated tags associated with digital content in accordance with one or more embodiments. In the illustrated example, nodes 302 of the graph are associated with various tags. Some of the tags have been grouped semantically in the graph through hierarchical relationships. For instance, the tags "score" 304, "shot" 306, "slam_&_dunk" 308, and "round" 310 are connected together, as illustrated via arrows. Also shown in the illustrated example are hierarchal relationships, examples of which include the tag "training" 312 being a parent of the tag "exercise" 314, the tag "unite" 316 being parent to both "chain" 318 and "recreation" 320, the tag "sport" 322 being a parent to the tag "winner" 324, and so on. In addition, the tag "round" 310 is a parent to the tag "shot" 306, which is in turn a parent to the tag "slam_&_dunk" 308. Thus, multi-level relationships can be established via the hierarchy.

In addition, some meaningful tags are clubbed together in the context of the digital content. For instance, tags such as "slam" and "dunk" have been combined to form an entity represented by the tag "slam_&_dunk" 308 in the context of the digital content. Any number of tags can be combined to form an entity, such as the entity in node 326, which includes a combination of nine different tags in the context of the digital content.

In the example implementation 300, nodes illustrated with hash marks are associated with tags that have been verified with the digital content, while nodes that are shaded are associated with tags that have been marked as related by relevance propagation. For instance, node 326 has been verified with the digital content based on feature detection identifying a basketball object in the digital content. Additionally, tags including "sport" 322, "round" 310, "shot" 306, "winner" 324, and "training" 312 have been identified as being related to the tag "basketball". The meaning of some tags, such as "round" 310 and "shot" 306, can vary depending on the context of the digital content, causing verification of such tags to be challenging without including the context of the digital content.

Figure 4:
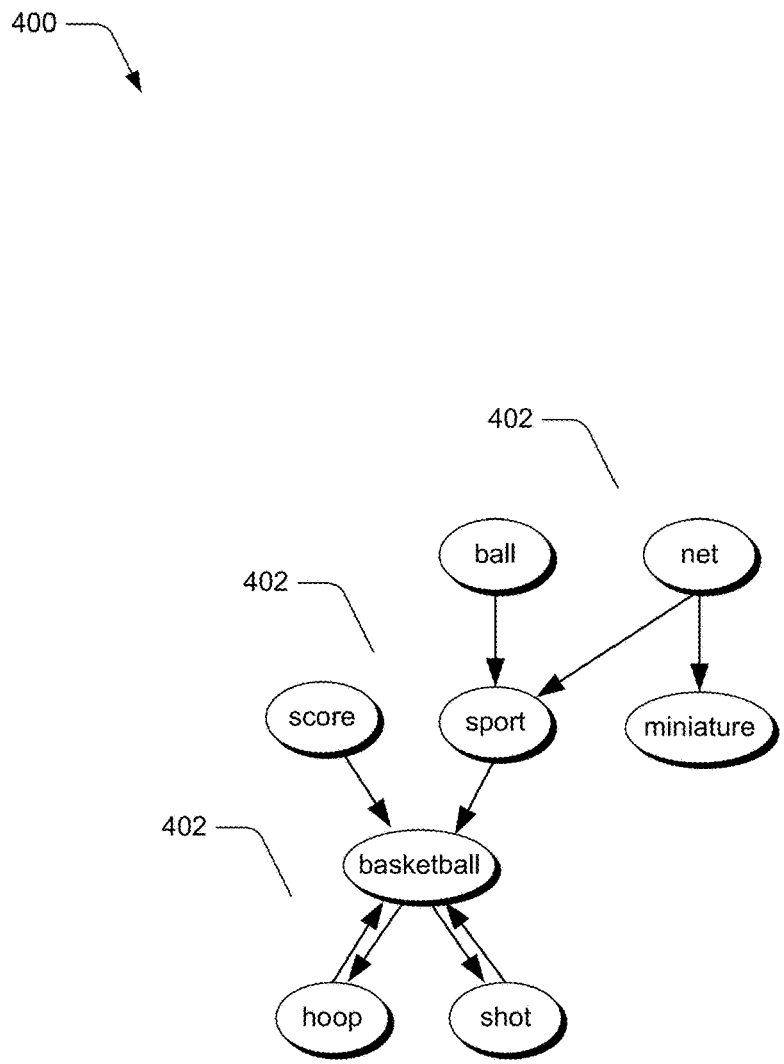
FIG. 4 depicts an example implementation that illustrates a hierarchical graph of user-generated tags for digital content in accordance with one or more embodiments.

FIG. 4 depicts an example implementation 400 that illustrates a hierarchical graph in accordance with one or more embodiments. The hierarchical graph shown in FIG. 4 represents example user-generated tags 402 for a video. In this example, the video (not shown) includes a basketball flying towards a basketball hoop. Using the techniques described above, the basketball in the video can be easily recognized using feature detection techniques to verify the given tags. The current scope of a search domain for this video may be limited to the few tags generated by the user. Thus, the tags for this video can be augmented using the techniques described above to expand the search domain and improve browsing and retrieval of this video. Extracting topic models from a tag corpus can result in many relevant and also irrelevant topics. However, using the hierarchy of semantic relationships, relevant tags can be identified and added to the hierarchy, while irrelevant tags may be left out of the hierarchy.

Figure 5:
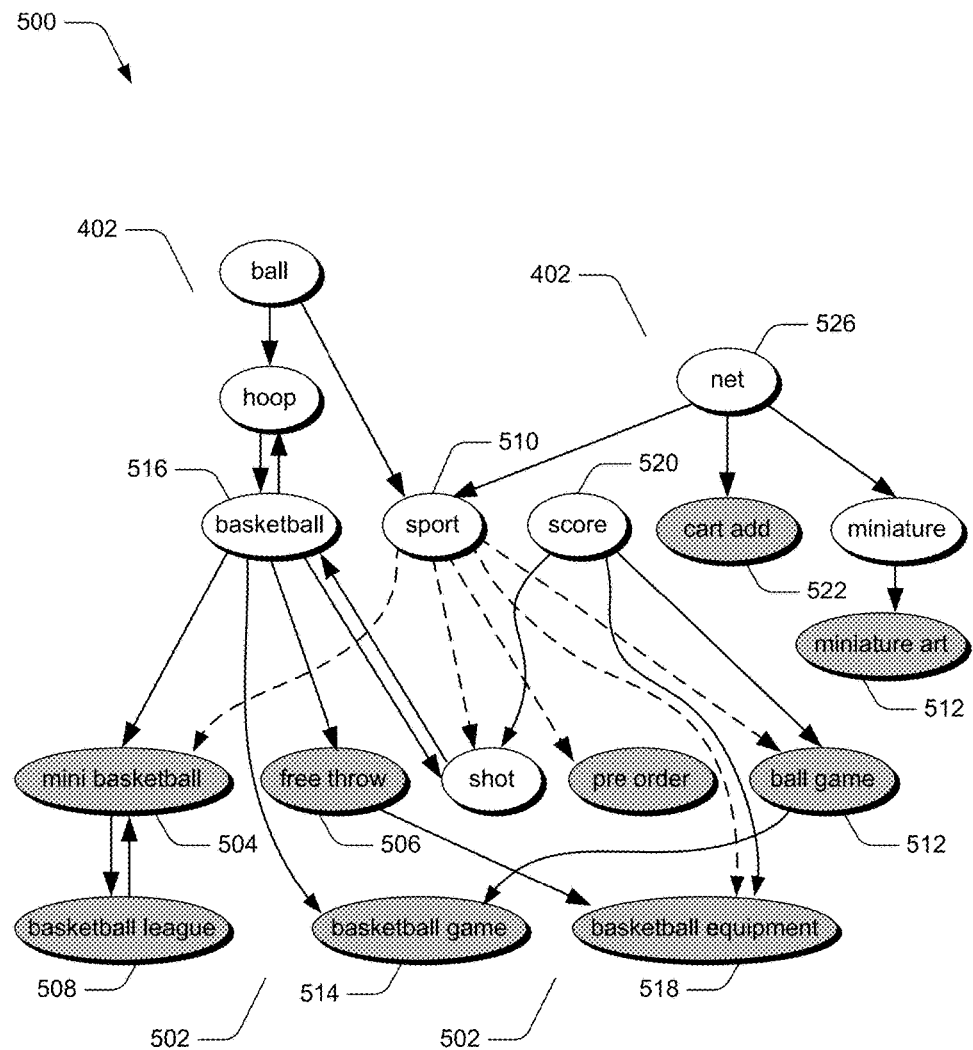
FIG. 5 depicts an example implementation that illustrates an augmented version of the hierarchical graph from FIG. 4 in accordance with one or more embodiments.

For example, consider FIG. 5, which depicts an example implementation 500 that illustrates an augmented version of the hierarchical graph from FIG. 4 in accordance with one or more embodiments. As illustrated in FIG. 5, various additional nodes 502 (illustrated with shading) have been added to the hierarchical graph from FIG. 4. The additional tags include "mini basketball" 504, "free throw" 506, "basketball league" 508, and so on. In addition, meaningful relationships have been established between various tags and are illustrated by arrows. Some examples of these meaningful relationships include relationships between "sport" 510 and "ball game" 512, between "ball game" 512 and "basketball game" 514, between "basketball" 516 and "free throw" 506, and so on. Additional tags such as "basketball league" 508, "basketball game" 514, "mini basketball" 504, "ball game" 512, and "basketball equipment" 518 are related to relevant user-generated tags (e.g., "basketball" 516, "sport" 510, and "score" 520), and are identified as being related to the content of the video by relevance propagation.

In contrast, some of the additional tags, such as "cart add" 522 and "miniature art" 524, are not identified as being related to the content of the video by relevance propagation, even though they may be related to a user-generated tag, such as "net" 526 in this example. Thus, the techniques described herein not only identify additional tags with which to augment the video, but also verify the additional tags with respect to the content of the video by first establishing hierarchical relationships with existing tags and then validating the additional tags by relevance propagation.

Example Procedures

The following discussion describes techniques that may be implemented utilizing the previously described systems and devices to audit and augment user-generated tags for digital content. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1.

Figure 6:
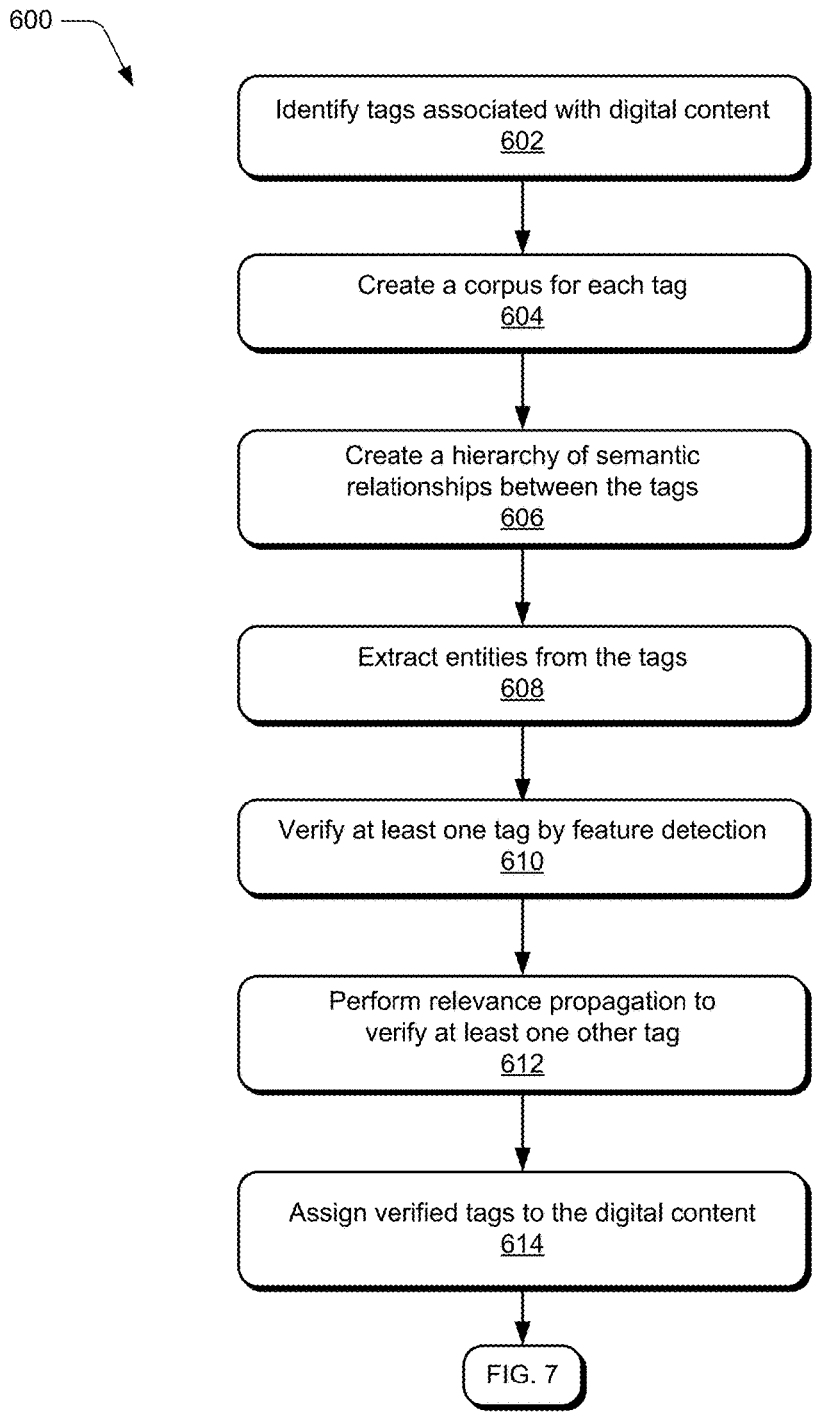
FIG. 6 is a flow diagram depicting a procedure in an example implementation in which techniques for auditing user-generated tags for digital content are employed in accordance with one or more embodiments.

FIG. 6 is a flow diagram depicting a procedure 600 in an example implementation in which techniques for auditing and augmenting use-generated tags for digital content are employed. Tags associated with digital content are identified (block 602). For example, tags are included in metadata associated with the digital content and can be identified in any of a variety of suitable ways. A corpus is created for each tag associated with the digital content (block 604). The corpus can be created in any suitable way. In one example, the tag can be used as a search query of a web-based search via the Internet to locate and use web page content of the top ten search results. In this way, various different meanings of the tag can be captured and represented by the corpus.

A hierarchy of semantic relationships is created between the tags (block 606). The semantic relationships can be created between the tags based on their corpus co-occurrence. For example, an occurrence of a first tag in a corpus associated with a second tag can indicate that the first tag is related to the second tag. Additionally, the corpus co-occurrence can create parent-child relationships between the tags based on a parent tag having a relatively higher number of occurrences in a child tag's corpus in comparison to a relatively lower number of occurrences of the child tag in the parent tag's corpus, where the difference in the number of occurrences is greater than a threshold value. The hierarchy can then be created based on the semantic relationships, including the parent-child relationships between the tags.

Entities are extracted from the tags (block 608). This step can be performed in any suitable way, examples of which are described above. For instance, two or more tags can be combined to form an entity. Combining tags can reduce ambiguities, redundancy, and polysemy in the tags, as well as provide additional context to individual tags to clarify their relevance to the digital content with which they are associated.

At least one tag is verified by feature detection (block 610). Any of a variety of feature detection techniques can be used, such as object detection, face detection, image annotation, classifiers, and so on. The feature detection techniques detect objects or faces in the digital content for comparison to the tag to verify whether the tag correlates to the digital content. For example, if a basketball is detected in a video, then tags such as "basketball" and "hoop" can be verified with the content of the video.

Relevance propagation is performed to verify at least one other tag (block 612). Some tags cannot be verified using feature detection techniques because those tags may be too abstract or generic. However, using the semantic relationships, the relevance of verified tags can be propagated up through the hierarchy to verify at least one other tag that is related to a verified tag. For example, the relevance of the tag "basketball" can be propagated to its parent tag "game" to verify the tag "game" with the content of the video.

Verified tags are assigned to the digital content (block 614). For example, the verified tags, and not unverified tags, are associated with the digital content to enable the digital content to be retrieved when subject to a search query matching one or more of the verified tags. The digital content may no longer be associated with user-generated tags that are not verified with the actual content of the digital content, which may prevent the digital content from being associated with misleading tags or from being retrieved when subject to a search query for a tag that is unrelated to the actual content of the digital content.

The method then continues to FIG. 7, which is a flow diagram depicting a procedure 700 in an example implementation in which techniques for augmenting user-generated tags for digital content are employed. Additional tags are identified for domain expansion of the digital content (block 702). This step can be performed in any suitable way. For example, a search can be conducted via the Internet or other database to identify additional words or phrases that are related to one or more of the user-generated tags, and which can be used as tags for the digital content.

The additional tags are added to the hierarchy (block 704). The additional tags can be added to the hierarchy of semantic relationships based on their corpus co-occurrence with the verified tags in the hierarchy. The semantic relationships are determined between the additional tags and only the verified tags of the user-generated tags in order to reduce processing and to reduce the number of potential unverifiable tags.

At least some of additional tags are verified using relevance propagation (block 706). For instance, the correspondence of the verified tags is propagated up through the hierarchy to at least one of the additional tags. In this way, the system can automatically verify and audit the additional tags to determine which of the additional tags correspond to the content.

Additional tags that have been verified are assigned to the digital content (block 708). This step can be performed in any suitable way, examples of which are described above. A relevance score is assigned to the digital content based on the correspondence of the verified tags (block 710). For example, individual correspondence values of the verified tags can be combined in any of a variety of ways to provide a relevance score (e.g., overall score) for the digital content. The relevance score is used to control how the digital content is retrieved (block 712). For example, the relevance score can be used to rank the digital content among other digital content when subject to a search query matching one or more of the verified tags assigned to the digital content.

Example System and Device

Figure 8:
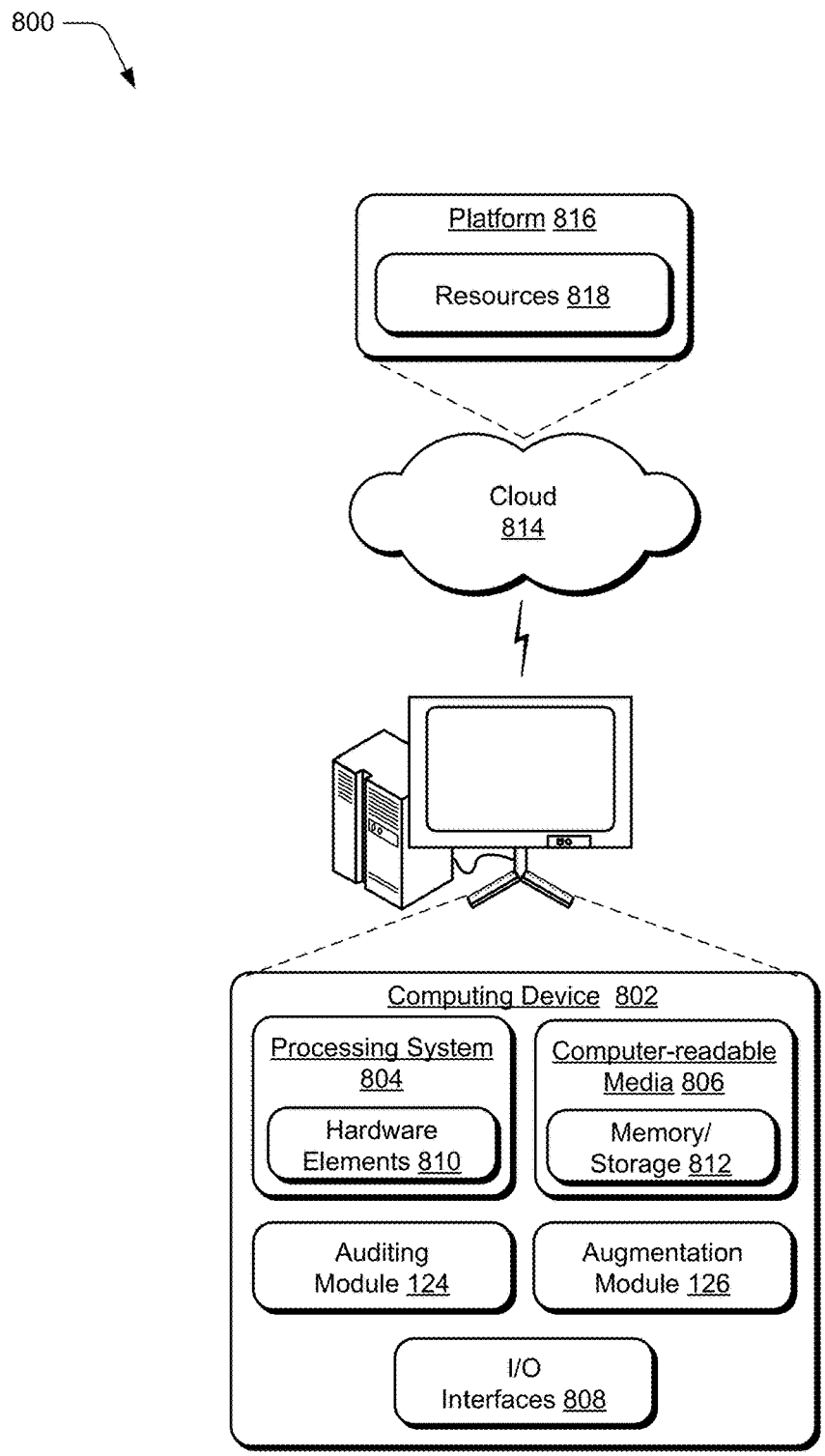
FIG. 8 illustrates various components of an example device that can be implemented as any type of computing device as described herein to implement the techniques and systems described herein.

FIG. 8 illustrates an example system generally at 800 that includes an example computing device 802 that is representative of one or more computing systems and/or devices that may implement the various techniques and systems described herein. This is illustrated through inclusion of the auditing module 124 and the augmentation module 126. The auditing module may be configured to create a hierarchy of semantic relationships between user-generated tags associated with digital content, to enable verification of tags having different levels of specificity with the digital content. The augmentation module 126 is configured to augment the user-generated tags by identifying additional tags that are related to verified user-generated tags and that can be assigned to the digital content to expand a search domain of the digital content. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques and systems described herein may be supported by various configurations of the computing device 802 and are not limited to the specific examples of the techniques and systems described herein. This functionality may also be implemented all or in part through use of a distributed system, such as over a "cloud" 814 via a platform 816 as described below.

Cloud 814 includes and/or is representative of a platform 816 for resources 818. Platform 816 abstracts underlying functionality of hardware (e.g., servers) and software resources of the cloud 814. Resources 818 may include applications and/or data that can be utilized while computer processing is executed on servers that are remote from the computing device 802. Resources 818 can also include services 820 provided over the Internet and/or through a subscriber network, such as a cellular or Wi-Fi network.

Platform 816 may abstract resources and functions to connect computing device 802 with other computing devices. Platform 816 may also serve to abstract scaling of resources to provide a corresponding level of scale to encountered demand for resources 818 that are implemented via platform 816. Accordingly, in an interconnected device embodiment, implementation of functionality described herein may be distributed throughout system 800. For example, the functionality may be implemented in part on computing device 802 as well as via platform 816 that abstracts the functionality of cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to audit and augment user-generated tags for digital content by hierarchical graph modeling using tag relationships based on corpus co-occurrences between the user-generated tags to control how the digital content is retrieved when subject to a search, a method implemented by at least one computing device, the method comprising:
    generating, by the at least one computing device, corpuses associated with the user-generated tags, each of the corpuses configured to model a respective tag of the user-generated tags based on a collection of other user-generated tags representing different aspects of a definition of the respective tag;
    creating, by the at least one computing device, a hierarchy of semantic relationships between the user-generated tags of the digital content based on the corpus co-occurrences between the user-generated tags, each corpus co-occurrence including an occurrence of one user-generated tag of a first corpus in a second corpus and a corresponding occurrence of another user-generated tag of the second corpus in the first corpus;
    verifying, by the at least one computing device, which of the user-generated tags correspond to the digital content, the verifying including:
        verifying a first user-generated tag of at least two user-generated tags based on a correspondence of the first user-generated tag to the digital content; and
        verifying a second user-generated tag of said at least two user-generated tags by propagating the correspondence of the first user-generated tag via the hierarchy to the second user-generated tag based on a corresponding semantic relationship within the hierarchy between the first user-generated tag and the second user-generated tag; and
    controlling retrieval of the digital content in response to the search by assigning, by the at least one computing device, the first user-generated tag and the second user-generated tag to the digital content based on verification of the first user-generated tag and the second user-generated tag to the digital content.

2. A method as described in claim 1, wherein the correspondence of the first user-generated tag is represented by a data value, and wherein the first user-generated tag is verified based on the data value exceeding a threshold value.

3. A method as described in claim 1, wherein the creating the hierarchy includes using conditional probabilities to distinguish different levels of specificity of said at least two tags of the user-generated tags.

4. A method as described in claim 1, further comprising transforming, by the at least one computing device, the semantic relationships into parent-child relationships based on the corpus co-occurrences between the user-generated tags.

5. A method as described in claim 1, wherein the first user-generated tag has a relatively higher level of specificity than a level of specificity associated with the second user-generated tag.

6. A method as described in claim 1, wherein the corpus co-occurrences are based on a first probability being relatively higher than a second probability by a value greater than a pre-defined threshold, the first probability corresponds to a parent tag occurring in a child-tag corpus associated with a child tag, and the second probability corresponds to the child tag occurring in a parent-tag corpus associated with the parent tag.

7. A method as described in claim 1, wherein the digital content is configured to be retrieved subject to the search which includes at least one of the first user-generated tag or the second user-generated tag.

8. A method as described in claim 1, further comprising expanding a search domain of the digital content by:
    identifying, by the at least one computing device, a set of tags that are not associated with the digital content but are related to the first user-generated tag and the second user-generated tag;
    adding, by the at least one computing device, the set of tags to the hierarchy based on an additional corpus co-occurrence between the set of tags, the first user-generated tag, and the second user-generated tag;
    detecting, by the at least one computing device, which tags from the set of tags are related to the first user-generated tag based on the hierarchy;
    propagating, by the at least one computing device, the correspondence of the first user-generated tag via the hierarchy to at least one tag from the set of tags;
    verifying, by the at least one computing device, the at least one tag from the set of tags based on the correspondence of the first user-generated tag; and
    assigning, by the at least one computing device, the at least one tag from the set of tags to the digital content to expand the search domain of the digital content.

9. A method as described in claim 8, further comprising scoring the digital content based on data values assigned to verified tags, wherein the verified tags include the first user-generated tag, the second user-generated tag, and the at least one tag from the set of tags, wherein the data values represent an associated correspondence of each of the verified tags to the digital content.

10. In a digital medium environment to audit and augment user-generated tags for digital content by hierarchical graph modeling using tag relationships based on corpus co-occurrences between the user-generated tags to control how the digital content is retrieved when subject to a search, a system comprising:
  at least one processor;
  at least one computer-readable storage media storing instructions that are executable by the at least one processor to implement a verification tool configured to perform operations to verify a relevance of the user-generated tags with the digital content, the operations including:
    generating, by the at least one computer-readable storage media, a corpus for a respective tag of the user-generated tags, the corpus configured to model the respective tag based on a collection of other user-generated tags representing different aspects of a definition of the respective tag;
    establishing, by the at least one computer-readable storage media, a hierarchy of semantic relationships between the user-generated tags based on the corpus co-occurrences between the user-generated tags, each corpus co-occurrence including an occurrence of one user-generated tag of a first corpus in a second corpus and a corresponding occurrence of another user-generated tag of the second corpus in the first corpus;
    verifying, by the at least one computer-readable storage media, which of the user-generated tags correspond to the digital content to provide at least one verified tag, the verifying including:
      verifying a first user-generated tag of at least two user-generated tags based on a correspondence of the first user-generated tag to the digital content; and
      verifying a second user-generated tag of said at least two user-generated tags by propagating the correspondence of the first user-generated tag via the hierarchy of the semantic relationships to the second user-generated tag; and
    controlling retrieval of the digital content in response to the search by assigning, by the at least one computer-readable storage media, the first user-generated tag and the second user-generated tag to the digital content to control how the digital content is retrieved when subject to the search.

11. A system as described in claim 10, wherein the operations further comprise, subsequent to the hierarchy of semantic relationships between the user-generated tags being established:
  extracting, by the at least one computer-readable storage media, at least one topic model from a corpus of verified tags of the user-generated tags, the verified tags including the first user-generated tag and the second user-generated tag;
  identifying, by the at least one computer-readable storage media, supplementary tags, using the at least one topic model, not associated with the digital content but related to the verified tags;
  adding, by the at least one computer-readable storage media, the supplementary tags to the hierarchy based on an additional co-occurrence between the verified tags and the supplementary tags; and
  propagating, by the at least one computer-readable storage media, the correspondence of the verified tags up the hierarchy based on the semantic relationships to the supplementary tags to automatically detect which of the supplementary tags correspond to the digital content.

12. A system as described in claim 11, wherein the supplementary tags include abstractions of the first user-generated tag.

13. A system as described in claim 10, wherein the corpus co-occurrences are based on a first probability being relatively higher than a second probability by a value greater than a pre-defined threshold, the first probability corresponds to a parent tag occurring in a child-tag corpus associated a child tag, and the second probability corresponds to the child tag occurring in a parent-tag corpus associated with the parent tag.

14. A system as described in claim 10, wherein the operations further include identifying, by the at least one computer-readable storage media, which of said at least two user-generated tags has a relatively higher level of specificity than a level of specificity associated with another of said at least two user-generated tags based on a corpus co-occurrence between said at least two user-generated tags.

15. A system as described in claim 10, wherein the operations further include combining, by the at least one computer-readable storage media, at least two nodes in the hierarchy to form an entity and reduce ambiguities in the user-generated tags, wherein said at least two nodes are associated with tags that are related to one another by more than a pre-defined threshold value.

16. In a digital medium environment to audit and augment user-generated tags for digital content by hierarchical graph modeling using tag relationships based on corpus co-occurrences between the user-generated tags to control how the digital content is retrieved when subject to a search, a method implemented by at least one computing device, the method comprising:
  creating, by the at least one computing device, a corpus for each user-generated tag associated with the digital content to model aspects of a definition of the user-generated tag based on a plurality of other user-generated tags;
  building, by the at least one computing device, a hierarchy of semantic relationships between the user-generated tags based on the corpus co-occurrences between the user-generated tags, each corpus co-occurrence including an occurrence of one user-generated tag of a first corpus in a second corpus and a corresponding occurrence of another user-generated tag of the second corpus in the first corpus;
  determining, by the at least one computing device, at least one correspondence of the user-generated tags to the digital content;
  verifying, by the at least one computing device, which of the user-generated tags correspond to the digital content based on the at least one correspondence being greater than a pre-defined threshold value to provide a first verified tag;
  propagating, by the at least one computing device, the at least one correspondence of the first verified tag via the hierarchy to a second tag of the user-generated tags based on the semantic relationships to verify the second user-generated tag and provide a second verified tag; and
  assigning, by the at least one computing device, the first verified tag and the second verified tag to the digital content to control how the digital content is retrieved when subject to the search.

17. A method as described in claim 16, further comprising extracting, by the at least one computing device, at least one entity from the user-generated tags by combining at least two user-generated tags that are related, wherein the at least one entity reduces ambiguities in the tags.

18. A method as described in claim 16, further comprising expanding a search domain of the digital content by at least:
- searching, by the at least one computing device, for supplementary tags that are not associated with the digital content and are related to verified tags of the user-generated tags;
- adding, by the at least one computing device, the supplementary tags to the hierarchy based on at least one additional corpus co-occurrence between the supplementary tags and the verified tags; and
- propagating, by the at least one computing device, the at least one correspondence of the verified tags up the hierarchy to at least one of the supplementary tags to provide a third verified tag.

19. A method as described in claim 18, further comprising, by the at least one computing device, assigning the third verified tag to the digital content to augment the user-generated tags associated with the digital content and expand the search domain of the digital content.

20. A method as described in claim 16, wherein the hierarchy is created using conditional probabilities that distinguish the different levels of specificity of at least two tags of the user-generated tags and create parent-child relationships between said at least two tags of the user-generated tags.

\* \* \* \* \*